(12) United States Patent
Yannay et al.

(10) Patent No.: US 7,830,839 B2
(45) Date of Patent: Nov. 9, 2010

(54) METHOD FOR DATA MESSAGE TRANSMISSION

(75) Inventors: Alon Yannay, Tel Aviv (IL); Aviv Barkan, Bat Hefer (IL); Danny Zadok, Rishon Letzion (IL)

(73) Assignee: Motorola, Inc., Schaumburg, IL (US)

( * ) Notice: Subject to any disclaimer, the term of this patent is extended or adjusted under 35 U.S.C. 154(b) by 728 days.

(21) Appl. No.: 11/759,709

(22) Filed: Jun. 7, 2007

(65) Prior Publication Data

US 2008/0004055 A1 Jan. 3, 2008

(30) Foreign Application Priority Data

Jun. 30, 2006 (GB) .................................. 0612968.8

(51) Int. Cl.
*H04W 4/00* (2009.01)
(52) U.S. Cl. ..................... 370/331; 455/442; 713/168
(58) Field of Classification Search ................. 370/329, 370/331; 455/443, 444, 466, 436–439
See application file for complete search history.

(56) References Cited

U.S. PATENT DOCUMENTS

| 5,883,888 | A * | 3/1999 | St-Pierre ..................... 370/331 |
| 6,721,291 | B1 * | 4/2004 | Bergenwall et al. ......... 370/331 |
| 7,600,040 | B1 * | 10/2009 | Henry et al. ................. 709/238 |
| 2002/0193114 | A1 * | 12/2002 | Agrawal et al. ............. 455/442 |
| 2003/0110294 | A1 | 6/2003 | Luo |
| 2003/0193952 | A1 | 10/2003 | ONeill |
| 2004/0133682 | A1 | 7/2004 | De Vriendt |
| 2004/0258018 | A1 | 12/2004 | Bjelland |
| 2005/0037758 | A1 | 2/2005 | Rimoni |
| 2005/0099976 | A1 | 5/2005 | Yamamoto |
| 2005/0163080 | A1 | 7/2005 | Suh |
| 2005/0255847 | A1 | 11/2005 | Han |
| 2006/0029020 | A1 | 2/2006 | Jung |
| 2006/0126645 | A1 | 6/2006 | Devarapalli |
| 2006/0224920 | A1 * | 10/2006 | Rooholamini et al. ......... 714/25 |
| 2006/0258358 | A1 * | 11/2006 | Kallio ......................... 455/437 |
| 2007/0204155 | A1 * | 8/2007 | Dutta et al. .................. 713/168 |

OTHER PUBLICATIONS

Park, et al. "An Efficient Fast Neighbor Discovery (EFND) Scheme to Reduce Handover Latency in Mobile IPV6", Advanced Communication Technology, ICACT 2006, Feb. 20-22, 2006.

(Continued)

*Primary Examiner*—Kent Chang
*Assistant Examiner*—Dinh P Nguyen
(74) *Attorney, Agent, or Firm*—Randi L. Karpinia; Anthony P. Curtis

(57) ABSTRACT

A method (200) of operation in a communication system (100) when a mobile node (107) is served in a network (103, 105) which is not its home network (101). The mobile node:

(a) when attached to a first service node (117) identifies (203) a second service node (123) as a candidate service node to which it can become attached by an attachment handover procedure;

(b) obtains (205) a new Care Of Address for use in association with attachment of the mobile node to the second service node;

(c) notifies (207) the second service node of its identity and of its new Care Of Address; and (d) notifies (213) a Home Agent for the mobile node of the identity of the second service node and/or of the new Care Of Address.

17 Claims, 2 Drawing Sheets

OTHER PUBLICATIONS

Park, et al. "A Fast Neighbor Discovery and DAD Scheme for Fast Handover in Mobile IPV6 Networking", International Conference on Systems and Internationational Conference on Mobile Communications and Learning Technologies, 2006.

Kim, et al. "A Fast Handoff Scheme for Mobile IPV6 Based Wireless Networks", Information, Communications and Signal Processing, Dec. 6-9, 2005, pp. 669-672.

* cited by examiner

METHOD FOR DATA MESSAGE TRANSMISSION

FIELD OF THE INVENTION

The present invention relates generally to a method and apparatus for use in communications. In particular, it relates to facilitating transmission of data to a mobile node when the mobile node is served by a communication network which is not its home network.

BACKGROUND OF THE INVENTION

In a communication system operating in accordance with the IP (Internet Protocol), data is sent in the form of a data message made up of data packets from a sending node or terminal to a receiving node or terminal. The data message is routed through the system using IP addressing protocols. Some systems also operate in accordance with the Mobile IP Standard defined by the IETF (Internet Engineering Task Force) which is a body that defines internet operating standards and is supervised by the Internet Society's Internet Architecture Board. The Mobile IP Standard as referred to herein is the industry standard of the IETF by which mobile nodes are provided with internet services when they are outside their home network. In particular, the Mobile IP Standard is defined in the documents issued by the IETF as RFC (Request Comments) 3344 dated August 2002 and RFC 3775 dated June 2004. These documents can be seen at http://www.ietf.org/rfc/rfc3344.txt and http://www.irtf.org/rfc/rfc2775.txt.

Each mobile node is identified by a home address and is served by a Home Agent operating in its home network. When attached for service to a network which is not its home network, a mobile node receives a Care Of Address which provides information about the current location at which the mobile node can be reached on the internet.

A mobile node is attached (operably coupled) for communication service to a service node. This attachment is known in the art as a 'Layer 2' attachment. 'Layer 2' refers to Layer 2 of the OSI (Open Systems Interconnection) well known protocol stack as adopted by the ISO (International Standards Organisation) and is used in the telecommunications industry to indicate functions relating to the data link between two points. The mobile node may switch its attachment from one service node to another. This switching is known in the art as handover or handoff. Where the mobile node remains attached, after handover, to the same network the handover is known more particularly as a 'Layer 2' handover. Where the switching of attachment also involves movement from one network to another, the handover is known as 'Layer 3' (network-to-network) handover. 'Layer 3' refers to Layer 3 of the OSI protocol stack as adopted by the ISO and is used in the telecommunications industry to indicate functions relating to the network level connection between two points.

Where a mobile node which is outside its home network undergoes handover, particularly Level 3 handover, it obtains a new Care of Address associated with the network of the service node to which it becomes attached. The mobile node registers the new Care Of Address with its Home Agent so that the Home Agent can forward data messages to the mobile node at the new Care Of Address. The Layer 3 handover is not completed until the new Care Of Address has been notified to and acknowledged by the Home Agent. In the prior art, there can be a considerable delay between the start and completion of a Layer 3 handover. When a mobile node detaches from a network in the handover procedure until it receives a new Care Of Address, the mobile node cannot send or receive IP addressed data messages. Furthermore, between receiving a new Care Of Address and completing the Layer 3 handover procedure, the mobile node can send but cannot receive IP addressed data messages. The period between a mobile node detaching from a network and completing a Layer 3 handover is known in the art as a 'service break'. Undesirably, significant delay or loss of data messages may take place during a service break using prior art handover procedures.

SUMMARY OF THE INVENTION

According to the present invention in a first aspect there is provided a method as defined in claim 1 of the accompanying claims.

According to the present invention in a second aspect there is provided a system.

According to the present invention in a third aspect there is provided a mobile node.

Further features of the present invention are as defined in the accompanying dependent claims and are disclosed in the embodiments of the invention to be described.

Embodiments of the present invention will now be described by way of example with reference to the accompanying drawings.

BRIEF DESCRIPTION OF THE DRAWINGS

The accompanying drawings, in which like reference numerals refer to identical or functionally similar elements throughout the separate views and which together with the detailed description below are incorporated in and form part of the specification, serve to further illustrate various embodiments and to explain various principles and advantages of the present invention.

In the accompanying drawings.

Figure 1:
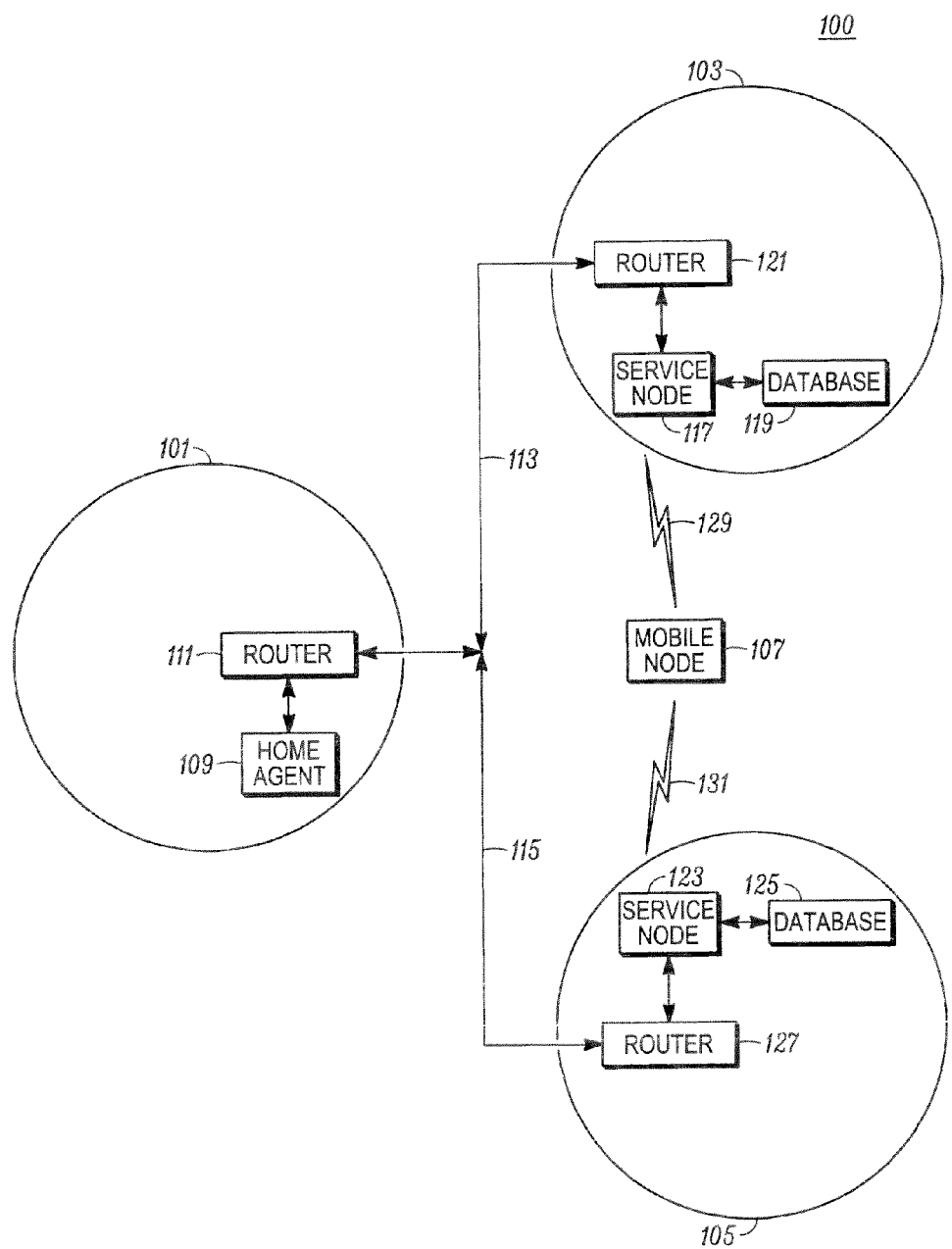
FIG. 1 is a block schematic diagram of a communication system which may be adapted in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DESCRIPTION OF EMBODIMENTS OF THE INVENTION

Before describing in detail embodiments that are in accordance with the present invention, it should be observed that the embodiments reside primarily in combinations of method steps and apparatus components related to facilitating transmission of data to a mobile node when the mobile node is served by a communication network which is not its home network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of facilitating transmission of data to a mobile node when the mobile node is served by a communication network which is not its home network. Any non-processor circuits may include, but are not limited to, a radio receiver, a radio transmitter, signal drivers, clock circuits, power source circuits, and user input devices. As such, these functions may be interpreted as steps of a method of operation to perform transmission of data to a mobile node when the mobile node is served by a communication network which is not its home network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

FIG. 1 is a block schematic diagram of an illustrative communication system 100 which may be adapted in accordance with an embodiment of the present invention. The system 100 includes a first network 101, a second network 103 and a third network 105. The first network 101 is the home network of a plurality of a mobile nodes (MN) one of which, a mobile node (MN) 107, is shown. The first network 101 includes a Home Agent (HA) 109 which is a server/router in or linked to the first network 101 which maintains a database relating to the current locations of mobile nodes for which the first network 101 is home network and which forwards data messages to such mobile nodes when attached for communication service to a network other than the first network 101.

The first network 101 includes a router 111 which routes communications inside the network 101 to and from the network 101. The router 111 is operably connected to the Home Agent 109. The first network 101 is linked to the second network 103 by a link 113 and is linked to the third network 105 by a link 115. The links 113 and 115 may be wired and/or wireless links and may optionally pass through other networks (not shown). The links 113 and 115 may themselves be mutually connected, as shown in FIG. 1.

Each of the second network 103 and the third network 105 includes a plurality of service nodes one of which is shown in each network, namely a first service node (SN) 117 in the second network 105 and a second service node 123 in the third network 107. The service nodes described herein including the service nodes 117 and 123 are typically base stations or access points which provide points of communication service attachment for mobile nodes. In other words, they comprise Layer 2 entities. However, the service nodes described herein also comprise Layer 3 entities as will become apparent later. In practice, the Layer 3 entity in each case may comprise a router provided as a separate unit connected to the Layer 2 entity of the service node.

The attachment of each mobile node to a service node as described herein may be a wired or wireless attachment.

The service node 117 is operably connected (at its Layer 3 entity) to a database 119 which stores data used in operation by the service node 117. The database 119 includes a routing table of destination addresses for mobile nodes attached for service (and, as described later, potentially attached for service) by the service node 117. The routing table also stores, for each destination address, the interface (e.g. link 129) via which data messages for that destination address are routed. The database 119 also includes an ARP (Address Resolution Protocol) table of addresses of mobile nodes. An ARP table is a table which records the MAC (Media Access Control) address, which is a unique Level 2 identifier, and the routing address, e.g. IP address, of each mobile node attached (and, as described later, potentially attached) for service to the service node 117. The second network 103 includes a router 121 which routes communications inside the network 103 to and from the network 103. The router 121 is operably connected to the first service node 117.

The second service node 123 in the third network 105 is operably connected (at its Layer 3 entity) to a database 125 which stores data used in operation by the service node 117, the data being similar to the data stored by the database 119 for the first service node 117.

The third network 105 includes a router 127 which routes communications inside the third network 105 to and from the network 105. The router 127 is operably connected to the second service node 123.

The mobile node 107 is attached for communication service to the first service node 117. The attachment of the mobile node 107 is illustrated by a link 129 (shown as a wireless link but, as noted above, which could be a wired link). The Home Agent 109 is aware of this attachment. It stores details of the attachment as an attachment of the mobile node 107 to a foreign network, which is a network other than the home network of the mobile node 107, namely the first network 101. The Home Agent 109 forwards in a known way to the mobile node 107 at a Care Of Address provided by the second network 103 data messages received by the Home Agent 109 on behalf of the mobile node 107. The data messages may comprise datagrams (a package of data packets) sent in accordance with IP (internet protocol) compatible procedures. The mobile node 107 may detect, e.g. because a received signal strength from the first service node 117 is less than a pre-determined threshold, that it needs to search for another service node to which it can become attached by a known handover (handoff) procedure. The handover procedure required may be a Layer 3 handover. In this situation, the system 100 proceeds to operate by a method 200 embodying the invention which will now be described with reference to FIG. 2.

Figure 2:
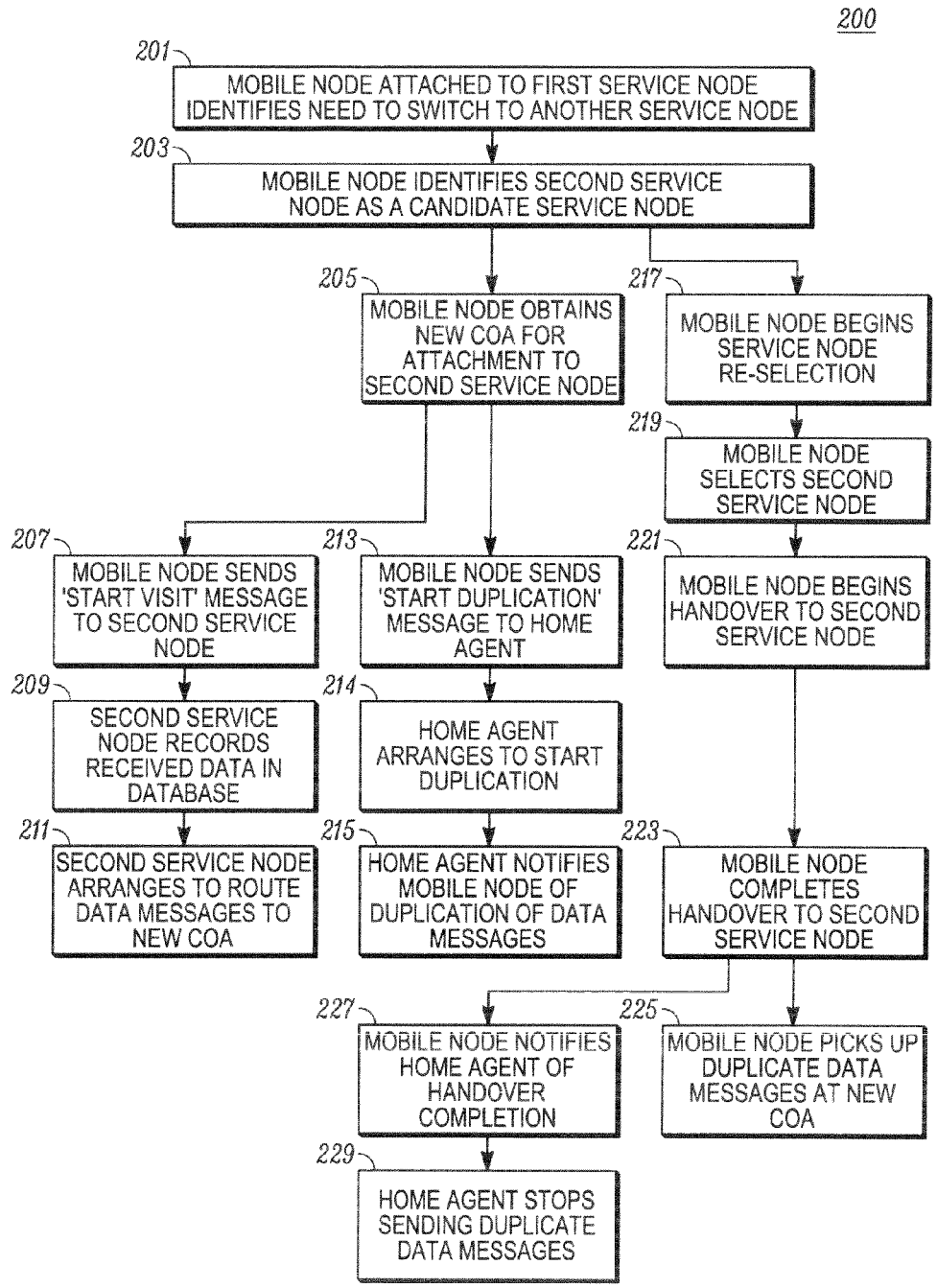
FIG. 2 is a flow chart of a method embodying the invention for use in the system of FIG. 1.

FIG. 2 is a flow chart of the method 200. The method 200 begins in a step 201 in which the mobile node 107 (MN) is currently attached for communication service to the first service node 117 and identifies a need to switch to another service node (SN) for service attachment. In a step 203, the mobile node 107 identifies the second service node 123 as a candidate service node (SN) to which the mobile node 107 might become attached. The mobile node 107 may obtain (or may already have obtained and recorded) the identity of the service node 123, and optionally of the network 105 and the router 127 via which it can be reached, in a known manner. For example, the service node 123 may obtain this information from periodic broadcast signals sent by the second service node 123 or alternatively by sending a query message to the second service node 123 and receiving a reply message including the required information. In a step 205, the mobile node 107 obtains a new Care Of Address (COA) for attachment to the second service node 123. Step 205 may be carried out in a known manner. For example, the Care Of Address may be obtained from announcements made by the second service node 123 or another node (not shown) of the third network 105. Alternatively, the Care Of Address may be obtained from a server (not shown) external to the third network 105 serving the system 100 in accordance with the Dynamic Host Configuration Protocol (DHCP) defined by the IETF (Internet Engineering Task Force) referred to earlier. This protocol is defined in the documents RFC 3315 (July 2003) and RFC 3361 (August 2002) issued by the IETF which can be seen at http://www.ietf.org/rfc/rfc3315.txt and http://www.ietf.org/rfc/rfc3363.txt.

In a step 207 which follows step 205, the mobile node 107 sends a 'Start Visit' message to the second service node 123. The 'Start Visit' message may be a standard format message generated automatically by the mobile node 107 and understood by the second service node 123. The 'Start Visit' message includes the new Care Of Address of the mobile node 107 obtained in step 205 and also the MAC address of the mobile node 107. In a step 209, the second service node 123 records in the database 125 the data which it receives in step 207 from the mobile node 107. The new Care Of Address is recorded for the mobile node 107 as a destination address associated with the link 131 (so that the service node 123 will be able to route data messages having that destination address to the link 131). This information is recorded in a routing table of destination addresses in the database 125. In addition, an ARP table of addresses of mobile nodes in the database 125 is updated to include the MAC and new Care Of Address of the mobile node 107. In a step 211, the second service node 123 arranges to route data messages, addressed to the new Care of Address, to the mobile node 107 via the link 131.

Following step 205, the mobile node 107 sends in a step 213 a 'Start Duplication' message to its Home Agent 109 (HA). The message may be transmitted on behalf of the mobile node 107 from the first service node 117 through the second network 103 to the router 121 and via the link 113 and the router 111 to the Home Agent 109. Alternatively, the message may be sent using a tunneling procedure known in the art, e.g. in accordance with the Mobile IP standard defined earlier. The 'Start Duplication' message identifies the second service node 123 and optionally the network 105 and the router 127 by which the second service node 123 may be reached. The 'Start Duplication' message also includes the new Care of Address obtained by the mobile node in step 205. In a step 214, the Home Agent 109 arranges to start duplication of data messages to be forwarded to the mobile node 107. Such messages are sent to (i) the current Care Of Address for the mobile node 107 associated with attachment of the mobile node 107 to the first service node 117; and also to (ii) the new Care of Address obtained by the mobile node 107 in step 205 and notified to the Home Agent 109 in step 213. In a step 215, which is an optional rather than essential step, the mobile node 107 is notified by the Home Agent 109 that duplication of data messages (step 214) has been started. If step 215 is omitted, the mobile node 107 may instead wait for a predetermined period of time (selected to suit the system 100) after step 213 before step 223 is deemed to have taken place.

Following step 203, the mobile node 107 begins a service node re-selection. Such a re-selection is carried out in a known way, e.g. by determining the service node which provides the best signal to the mobile node 107. In a step 219, the mobile node 107 selects from the re-selection procedure the second service node 123 as the service node to which it will become attached by a handover procedure. In a step 221 which follows step 219, the mobile node 107 begins handover of service attachment in a known manner to the second service node 123. The mobile node 107 completes handover of attachment to the second service node 123 in a step 223. In a step 225 which follows step 223 and may be designed to be not earlier than step 215 (or step 214 if step 215 is not included), the mobile node 107 picks up any duplicate data messages already sent by the Home Agent 109 to the new Care of Address. In a step 227 which follows step 223 in parallel with step 225, the mobile node 107 notifies the Home Agent 109 that it has completed its attachment handover to the second service node 123. The notification may be in a standard message format generated automatically by the mobile node 107 and understood by the Home Agent 109. Finally, in a step 229 which follows receipt by the Home Agent 109 of the notification sent in step 227, the Home Agent 109 stops sending duplicates of data messages to the mobile node 107. The Home Agent 109 sends only a single copy of such data messages to the new Care of Address of the mobile node 107 associated with attachment to the second service node 123.

All of steps 207 to 215 are newly applied steps which are carried out in expectation of a handover of service attachment of the mobile node 107 from the first service node 117 to the second service node 123. Where following step 201 the mobile node 107 identifies at least one other suitable service node to which it could become attached, steps similar to steps 207 to 215 may be carried out in respect of potential attachment to the at least one other service node. However, steps 207 to 215 are preferably begun only after the mobile node 107 has selected in step 219 the second service node 123 as the service node to which it will become attached by a handover procedure, as illustrated in FIG. 2.

By inclusion of the newly applied steps 207 to 215 in the method 200, potential delay in receipt or loss by the mobile node 107 of data messages forwarded by the Home Agent 109 is beneficially avoided or minimized. Such potential delay or loss could be significant, for example where one of the links involved, e.g. the link 115, comprises a long delay link, e.g. a satellite radio link.

In the method 200, a delay may be applied in the mobile node 107 between step 219 and step 221 or between step 219 and step 223. The delay may be applied to ensure that step 214 (and preferably steps 211 and 215) is completed not later than step 223. A suitable delay, if required, may be selected by design based upon knowledge of how quickly steps 213 and 214 (and steps 207 to 211 and step 215) are likely to be completed.

The system 100 or at least one of the networks included in it may be an IP (Internet Protocol) network whose Layer 3 (network level) communication protocol is the IP. The system 100 and the method 200 may operate in accordance with the Mobile IP Standard, referred to and defined earlier in the Background section, which specifies protocols for provision of IP communication services to a mobile node which is outside its home network. The system 100, or at least one of the networks operating in it, may be a communication network operated by or on behalf of a private or commercial operator. Where the system 100 or one of the networks operating in it is a wireless communication network, it may be a network operating according to an industry standard wireless communication protocol, e.g. the TETRA standard (Terrestrial Trunked Radio standard defined by the European telecommunication Standards Institute) or the APCO 25 standard (Project 25 defined by the Association of Public-Safety Communications Officials International, Inc). Alternatively it may be a WLAN (Wireless Local Area Network), e.g. operating in accordance with the 802.11 standard defined by the IEEE (Institute of Electrical and Electronic Engineers).

In the foregoing specification, specific embodiments of the present invention have been described. However, one of ordinary skill in the art appreciates that various modifications and changes can be made without departing from the scope of the present invention as set forth in the accompanying below. Accordingly, the specification and drawings are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this patent application and all equivalents of those claims as issued.

The invention claimed is:

1. A method of operation in a communication system to facilitate transmission of data messages to a mobile node when the mobile node is served in a network which is not its home network, the method including:
  within the mobile node:
    (a) when attached to a first service node identifying a second service node as a candidate service node to which the mobile node can become attached by an attachment handover procedure;
    (b) obtaining a new Care Of Address for use with attachment of the mobile node to the second service node;
    (c) notifying the second service node of its identity and of its new Care Of Address;
    (d) notifying a Home Agent for the mobile node of the identity of the second service node and/or of the new Care Of Address;
    wherein steps (b), (c) and (d) are carried out before any attachment handover to the second service node; and
    (e) in response to the notification in step (c) the second service node establishing a capability to route data messages addressed to the mobile node at the new Care Of Address;
    (f) the Home Agent in response to the notification in step (d) establishing a capability to send duplicate copies of data messages addressed to the mobile node at (i) a current Care Of Address associated with attachment of the mobile station to the first service node and at (ii) the new Care Of Address obtained in step (b);
  after (f) the Home Agent notifying the mobile node that the duplication of messages has been started;
    (g) following steps (e) and (f) the mobile node completing service attachment handover from the first service node to the second service node;
    (h) following completion of the handover, the mobile node notifying the Home Agent of completion of the handover; and
    (i) in response to (h), the Home Agent stopping the duplication of data messages, the data messages being forwarded only to the new Care Of Address after the stopping of duplication.

2. A method according to claim 1 including the second service node recording, in response to receiving the notification sent in step (c), the identity and the new Care of Address of the mobile node in an associated database.

3. A method according to claim 1 wherein steps (c) and (d) are carried out after the mobile node has undertaken a service node re-selection procedure and has selected the second service node for communication service attachment by a service attachment handover procedure.

4. A method according to claim 1 including the mobile node picking up data messages already received at the new Care Of Address from the Home Agent following completion of the handover.

5. A method according to claim 1 wherein the method operates in accordance with Mobile Internet Protocol Standard procedures.

6. A method according to claim 1, wherein notifying the Home Agent for the mobile node of the identity of the second service node and/or of the new Care Of Address comprises sending a 'Start Duplication' message to the Home Agent to start duplication of the data messages addressed to the mobile node using the current Care Of Address and the new Care Of Address.

7. A method of operation in a communication system to facilitate transmission of data messages to a mobile node when the mobile node is served in a network which is not its home network, the method including:
  within the mobile node:
    (a) when attached to a first service node identifying a second service node as a candidate service node to which the mobile node can become attached by an attachment handover procedure;
    (b) obtaining a new Care Of Address for use with attachment of the mobile node to the second service node;
    (c) notifying the second service node of its identity and of its new Care Of Address;
    (d) notifying a Home Agent for the mobile node of the identity of the second service node and/or of the new Care Of Address, wherein notifying the Home Agent for the mobile node of the identity of the second service node and/or of the new Care Of Address comprises sending a 'Start Duplication' message to the Home Agent to start duplication of the data messages addressed to the mobile node using the current Care Of Address and the new Care Of Address;
    wherein steps (b), (c) and (d) are carried out before any attachment handover to the second service node; and
    (e) in response to the notification in step (c) the second service node establishing a capability to route data messages addressed to the mobile node at the new Care Of Address;
    (f) the Home Agent in response to the notification in step (d) establishing a capability to send duplicate copies of data messages addressed to the mobile node at (i) a current Care Of Address associated with attachment of the mobile station to the first service node and at (ii) the new Care Of Address obtained in step (b);
    (g) following steps (e) and (f) the mobile node completing service attachment handover from the first service node to the second service node;
    (h) following completion of the handover, the mobile node notifying the Home Agent of completion of the handover; and (i) in response to (h), the Home Agent stopping the duplication of data messages, the data messages being forwarded only to the new Care Of Address after the stopping of duplication.

8. A method according to claim 7 further comprising the mobile node selecting a predetermined period of time to wait after sending the 'Start Duplication' message to the Home Agent, the predetermined period of time being selected by the mobile node dependent on the communication system such that the predetermined period of time is sufficient to ensure that the second service node has started routing messages to the new Care Of Address and that the Home Agent has started duplication.

9. A method according to claim 7 wherein the 'Start Duplication' message identifies the second service node as well as a network and router by which the second service node may be reached.

10. A method according to claim 7 wherein the 'Start Duplication' message is transmitted on behalf of the mobile node from the first service node to the Home Agent.

11. A method according to claim 7 further comprising the second service node recording, in response to receiving the notification sent in step (c), the identity and the new Care of Address of the mobile node in an associated database.

12. A method according to claim 7 wherein steps (c) and (d) are carried out after the mobile node has undertaken a service node re-selection procedure and has selected the second service node for communication service attachment by a service attachment handover procedure.

13. A method according to claim 7 further comprising the mobile node picking up data messages already received at the new Care Of Address from the Home Agent following completion of the handover.

14. A method according to claim 7 wherein the method operates in accordance with Mobile Internet Protocol Standard procedures.

15. A method according to claim 7 further comprising after (f) the Home Agent notifying the mobile node that the duplication of messages has been started.

16. A method according to claim 7 further comprising after (f) the mobile node waiting for a predetermined period of time sufficient for the duplication being deemed to have taken place.

17. A method according to claim 16 wherein the mobile node waits for the predetermined period of time rather than the Home Agent notifying the mobile node that the duplication of messages has been started.

* * * * *

UNITED STATES PATENT AND TRADEMARK OFFICE
CERTIFICATE OF CORRECTION

| | | |
|---|---|---|
| PATENT NO. | : 7,830,839 B2 | |
| APPLICATION NO. | : 11/759709 | |
| DATED | : November 9, 2010 | |
| INVENTOR(S) | : Yannay et al. | |

It is certified that error appears in the above-identified patent and that said Letters Patent is hereby corrected as shown below:

ON THE TITLE PAGE:

On Page 2, in Item (56), under "OTHER PUBLICATIONS", in Column 1, Line 3, delete "Internationational" and insert -- International --, therefor.

IN THE SPECIFICATION

In Column 1, Line 28, delete "Comments)" and insert -- For Comments) --, therefor.

In Column 1, Lines 30-31, delete "http://www.irtf.org/rfc/rfc2775.txt." and insert -- http://www.ietf.org/rfc/rfc3775.txt. --, therefor.

In Column 2, Line 48, delete "DESCRIPTION" and insert -- DETAILED DESCRIPTION --, therefor.

In Column 5, Lines 23-24, delete "http://www.ietf.org/rfc/rfc3363.txt." and insert -- http://www.ietf.org/rfc/rfc3361.txt. --, therefor.

Signed and Sealed this
Fifteenth Day of May, 2012

David J. Kappos
*Director of the United States Patent and Trademark Office*